(12) United States Patent
Solano-Serena et al.

(10) Patent No.: US 6,403,365 B1
(45) Date of Patent: Jun. 11, 2002

(54) PROCESS FOR BACTERIAL TREATMENT OF HYDROCARBON EFFLUENTS THAT CONTAIN ISOALKANES

(75) Inventors: Floriane Solano-Serena, Nanterre; Rémy Marchal, Chatou; Jean-Paul Vandecasteele, Fourqueux, all of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/521,775

(22) Filed: Mar. 9, 2000

(51) Int. Cl.⁷ .............................................. C12S 13/00
(52) U.S. Cl. .................... 435/262.5; 435/266; 435/264; 210/611
(58) Field of Search .................. 435/253.1, 252.32, 435/262, 262.5, 264, 266, 281, 843, 252.1; 210/601, 611; 405/128.1, 128.5, 128.75

(56) References Cited

U.S. PATENT DOCUMENTS

| | | | |
|---|---|---|---|
| 4,432,887 A | 2/1984 | Zajic et al. | 252/331 |
| 4,765,902 A | * 8/1988 | Ely et al. | |
| 5,334,533 A | 8/1994 | Colasito et al. | 435/264 |
| 5,679,364 A | 10/1997 | Levy | 424/405 |

FOREIGN PATENT DOCUMENTS

FR     2.007.109     1/1970

OTHER PUBLICATIONS

Fuller et al. Caplus Abstract No. 1995:646029 of 'Biodegradation of trichloroethylene and toluene by indigenous microbial populations in vadose sediment'. Microb. Ecol. (1995), vol. 29, No. 3, pp. 311–325.*
Solano–Serena et al. Caplus Abstract No. 1999:246234 of 'Intrinsic capacities of soil microflora for gasoline degradation.' Biodegradation (1998), vol. 9, No. 5, pp. 319–326.*

* cited by examiner

*Primary Examiner*—William H. Beisner
(74) *Attorney, Agent, or Firm*—Millen, White, Zelano, & Branigan, P.C.

(57) ABSTRACT

A process for treating hydrocarbon-containing effluents that comprise isoalkanes to reduce the hydrocarbon concentration at least partly is described, characterized in that in the presence of a suitable substrate, a *Corynebacterium urealyticum* CIP-I-2126 bacterium is grown, and the hydrocarbons that are contained in the effluents are degraded by the biomass of said bacteria that is thus produced. Application for pollution control of water and soil contaminated by hydrocarbons and optionally by ethers that come from a gasoline, kerosene and/or gas oil fraction.

21 Claims, No Drawings

PROCESS FOR BACTERIAL TREATMENT OF HYDROCARBON EFFLUENTS THAT CONTAIN ISOALKANES

A process for treating hydrocarbon-containing effluents that comprise isoalkanes to reduce the hydrocarbon concentration at least partly is described, characterized in that in the presence of a suitable substrate, a *Corynebacterium urealyticum* CIP-I-2126 bacterium is grown, and the hydrocarbons that are contained in the effluents are degraded by the biomass of said bacteria that is thus produced.

Application for pollution control of water and soil contaminated by hydrocarbons and optionally by ethers that come from a gasoline, kerosene and/or gas oil fraction.

The invention relates to microorganisms that are capable of degrading in particular isoalkanes and ethers. It pertains particularly to the industries for treatment of water and soil contaminated by petroleum fractions, such as gasoline, gas oil or kerosene.

The prior art is illustrated by Patents FR-A-2 007 109, U.S. Pat. No. 5,679,364, U.S. Pat. No. 4,432,887, and U.S. Pat. No. 5,334,533.

For gasolines, the elimination of tetraethyl lead had the effect of developing new formulations in which the isoalkanes and oxidized products, such as ethers, are important components. Actually, the isoalkanes such as isooctane (2,2,4-trimethylpentane) and the oxidized compounds, such as ethers like methyl-tert-butyl ether (MTBE), but also ethyl-tert-butyl ether (ETBE) and tert-methyl amyl ether (TAME), make it possible to impart good octane ratings to the gasolines.

Accidental dumping of these products leads to pollution of the soil and groundwater or surface waters. The aromatic compounds such as benzene, toluene, ethylbenzene, and xylene are easily degraded by the microflora of the soil (Tsao, C.-W. et al. 1998. Appl Environ Microbiol 64: 4924–4929; Zhang, W. and Bouwer, E. J. 1997. Biodegradation 8: 167–175; Alvarez, P. J. J. and Vogel, T. M. 1991. Appl Environ Microbiol 57: 2981–2985). Conversely, the compounds that comprise highly substituted carbon atoms are very resistant to biodegradation by the microorganisms in the environment.

The literature that relates both to the biodegradation of highly substituted isoalkanes and to the biodegradation of alkyl ethers that are used in the gasolines indicates that the metabolism of these compounds in the environment is not a common phenomenon. It is relatively slow under aerobic conditions and under anaerobic conditions, even nonexistent for isoalkanes under anaerobiosis (McKenna, E. J. 1972. In: Degradation of Synthetic Organic Molecules in the Biosphere. National Acad Sci, pp. 73–97; Nakajiama et al. 1985. Agr Biol Chem 49: 1993–2002).

A new bacterium was discovered that makes it possible to degrade isoalkanes, particularly the most resistant that have in particular a quaternary carbon atom, such as 2,2-dimethylpentane, 2,2,4-trimethylpentane and polysubstituted alkanes such as 2,3-dimethylpentane and 2,3,4-trimethylpentane, as well as ethers.

One of the objects of the invention is to describe a process that uses this new bacterium to degrade hydrocarbons and particularly isoalkanes and alkanes as well as other hydrocarbons in gaseous or aqueous effluents so that the releases are compatible with the standards in force.

Another object is to degrade at least in part a gasoline-type hydrocarbon fraction that is contained in effluents that can contain ethers such as MTBE, ETBE and/or TAME.

Another object is to degrade at least in part a hydrocarbon fraction that is contained in the kerosene type effluents and/or gas oil type effluents.

Another object of the invention is the use of this bacterium for the decontamination in situ of polluted soil. This new bacterium has been filed Feb. 8, 1999 at the Institut Pasteur (CNCM of the Institut Pasteur, 25, rue du Docteur Roux, F75724, Paris Cedex 15) in the name of *Corynebacterium urealyticum* CIP-1-2126.

More specifically, the invention relates to a process for treatment of hydrocarbon-containing effluents that comprise isoalkanes to reduce at least in part the hydrocarbon concentration, characterized in that in the presence of a suitable substrate, a *Corynebacterium urealyticum* CIP-I-2126 bacterium is grown, and the hydrocarbons that are contained in the effluents are degraded by the biomass of said bacteria that is thus produced.

The bacterium according to the invention was previously selected in a phreatic layer that was formerly contaminated by an advantageously unleaded gasoline fraction before being inoculated in the presence of said effluent that contains hydrocarbons.

According to a characteristic of the process, the growth substrate can comprise said effluents that contain hydrocarbons.

According to a variant, the substrate can be selected from the group that is formed by alcohols, preferably primary or secondary alcohols, with 2 to 8 carbon atoms, optionally hydroxylated aliphatic monacids or polyacids, with 2 to 8 carbon atoms, optionally hydroxylated aliphatic monoacid or polyacid salts with 2 to 8 carbon atoms, isooctane and mixtures thereof.

Excellent results were obtained when the substrate was ethanol, isooctane, the acetate of an alkaline metal salt or ammonium salt, alone or mixed with one another. Isooctane in particular proves to be an excellent substrate.

According to another characteristic of the process, the hydrocarbon concentration in the liquid effluents can be at most equal to 1700 mg/L and preferably between 300 and 1000 mg/L.

It was already mentioned that the effluents can additionally contain hydrocarbons of a gasoline, kerosene or gas oil fraction, at least one ether that improves their properties. The gasoline fraction thus preferably can contain the MTBE, ETBE, TAME or mixture thereof to improve its octane rating.

Under these conditions, it is possible to degrade the effluents that contain the hydrocarbons and at least one ether by the biomass of bacteria produced in the presence of at least one colony that is selected from the group that is formed by *Pseudomonas cepacia* CIP I-2052, *Arthrobacter globiformis* ATCC 53596, *Bacillus vaccae* JOB5 for mineralizing essentially the entire ether.

The concentration of the ether in the effluent can be between 50 and 1500 mg/L and preferably between 100 and 500 mg/L.

The ex-situ techniques of biological clean-up of the pollution relate to soil and groundwater. The treatment of the soil uses the aerating technique (venting) that makes possible the recovery of volatile products in the form of a gas phase. These gaseous effluents, just like the liquid effluents, polluted groundwater, for example, can then be treated by a biofilter. They are introduced into the biofilter, for example, in which the bacteria are attached to a mineral substrate or organic substrate, or else they can be added as an inoculum to sewage purification plant sludges. The effluents can be enriched with isooctane to improve the growth stage.

According to an embodiment, it is possible to use the colony according to the invention in the presence of air in at least one biofilter that is fed with the effluent from which pollution is to be removed. According to a more advantageous mode, it is preferable to use a system of two or more biofilters that are placed in series. The first, inoculated with, for example, an aerobic microflorum of a sewage purification plant sludge, mainly degrades the aromatic compounds, while the second, inoculated with at least the CIP-I-2126 colony, degrades the refractory compounds such as the isoalkanes and the cycloalkanes in the presence of air or oxygen. The feed rate is, for example, between 0.1 and 2 L/L of biofilter/hour. The effluent, from which hydrocarbons and optionally ethers have been removed at least in part, is then drawn off.

The invention will be better understood based on the following examples that illustrate the invention.

EXAMPLE 1 (According to the Invention)

Isolation of the Colonies that Degrade the Isoalkanes

The isolation method is essential for obtaining colonies that degrade in particular isoalkanes.

Samples of water, taken from a phreatic layer formerly contaminated by a gasoline fraction, are used to inoculate, at the inoculation rate of 10% (v/v), hermetically sealed flasks that contain a minimum vitaminized saline medium (MMSV), whose composition is as follows:

| | |
|---|---|
| $Na_2HPO_4, 12H_2O$ | 4.5 g/L |
| $NH_4NO_3$ | 1.0 g/L |
| $KH_2PO_4$ | 680 mg/L |
| $MgSO_4, 7H_2O$ | 100 mg/L |
| $FeSO_4, 7H_2O$ | 1 mg/L |
| $MnSO_4, H_2O$ | 100 µg/L |
| $(NH_4)_6Mo_7O_{24}, H_2O$ | 25 µg/L |
| $NaB_4O_7, 10H_2O$ | 25 µg/L |
| $Co(NO_3)_2, 6H_2O$ | 25 µg/L |
| $CuCl_2$ | 25 µg/L |
| $ZnCl_2$ | 25 µg/L |
| $NH_4NO_3$ | 10 µg/L |
| biotin | 200 µg/L |
| pyridoxine | 100 µg/L |
| riboflavin | 50 µg/L |
| nicotinamic acid | 50 µg/L |
| panthotenate | 50 µg/L |
| p-aminobenzoic acid | 50 µg/L |
| lipoic acid | 50 µg/L |
| folic acid | 20 µg/L |
| thiamine | 15 µg/L |
| cyanocobalamine | 1.5 µg/L |

Immediately after inoculation, the growth substrate, isooctane (or 2,2,4-trimethylpentane) is added to the MMSV medium at a rate of 500 mg/l. After three weeks of incubation while being stirred at 30° C., it is noted that the absorbance of this enrichment culture increased by about 0.1 unit. A first transplanting in a medium of identical composition is then initiated at the same inoculation rate as for the enrichment culture. When growth is again identified by an increase in absorbance, a second transplanting is carried out under the same conditions as above. After fifteen days of incubation, an aliquot portion of the liquid culture medium is then sampled and spread on the Petri dishes of gelose MMSV medium. These dishes are incubated in a closed chamber, and isooctane is provided in vapor form by placing a test tube that contains several milliliters of pure isooctane in the chamber. After fifteen days of incubation at 30° C., colonies that are identified on the surface of the gelose medium are isolated. They are capable of degrading the isooctane. One of them constitutes the CIP-I-2126 colony. It is necessary to treat many samples to isolate an active colony, which indicates that the latter are relatively rare in the environment.

Identification of the CIP-I-2126 Colony

The CIP-I-2126 colony that has the capacity for degrading isooctane has been subjected to biochemical tests to be identified by its phenotypical characters.

The CIP-I-2126 colony is a strict aerobic bacillus that is gram-positive, non-mobile, non-sporulated, non-capsulated, and unbranched. The biochemical characters for identification are as follows:

Strict aerobic respiratory metabolism
    catalase+
    oxydase−
    reductase nitrate−
    reductase nitrite−
    urea+
    esculin−
    tween-80-esterase+

API positive coryne character gallery: a-glucosidase, urea, catalase. The biochemical characters that are expressed show that the CIP-I-2126 colony belongs to the *Corynebacterium urealyticum* strain.

Degradation of Isooctane

To evaluate simply and quantitatively the capacity for degradation of the isoalkanes of the *C. urealyticum* CIP-I-2126 colony, we used a reference substrate, isooctane. A 500 ml Erlenmeyer flask that is hermetically sealed and that contains 55 ml of MMSV medium to which 345 mg/l of isooctane was added is inoculated by the CIP-I-2126 colony. The culture is agitated (300 rpm) at a temperature of 30° C. for 28 days. The residual isooctane of the flasks is measured after extraction with dichloromethane and separation by gas phase chromatography on a PONA column (Chrompack) and flame ionization detection. Concurrently with the measurement of the residual substrate, the amount of $CO_2$ that is produced during the test is followed by chromatography by sampling aliquot fractions (250 µl) of the top space in the flask. The gaseous sample that is taken is injected into a chromatograph that is equipped with a Porapak column (millipore Corp.) and provided with a catharometric detector. The $CO_2$ that is produced is evaluated with an external standard. The rate of degradation of the isooctane, which is equal to the isooctane molar fraction that is consumed by the culture, as well as the mineralization rate, are calculated. The latter is equal to the ratio of the amounts of carbon found in the CO2 that is produced to the amount of carbon that is introduced in the form of isooctane. The results that are obtained with the CIP-I-2126 colony are presented in Table 1.

TABLE 1

Kinetic Tracking of the Degradation of the Isooctane by the CIP-I-2126 Colony

| LENGTH OF INCUBATION (H) | RATE OF DEGRADATION (%) | RATE OF MINERALIZATION (%) |
|---|---|---|
| 50 | 20 | 10 |
| 75 | 52 | 13 |
| 135 | 100 | 33 |

TABLE 1-continued

Kinetic Tracking of the Degradation of the Isooctane by
the CIP-I-2126 Colony

| LENGTH OF INCUBATION (H) | RATE OF DEGRADATION (%) | RATE OF MINERALIZATION (%) |
|---|---|---|
| 500 | 100 | 50 |
| 672 | 100 | 50 |

It is noted that the *C. urealyticum* CIP-I-2126 colony is capable of degrading all of the isooctane that is introduced. At the end of the test, 50% of the carbon has been mineralized in CO2. The carbon that is not mineralized is used for the production of biomass or else intermediate metabolites that are at least in part consumed.

EXAMPLE 2 (Counter-example)

Samples of activated sludges taken in an urban waste water purification plant are used to carry out isolations of colonies under conditions that are identical to those that are described in Example 1. After three weeks of incubation, the absorbance of the enrichment culture has not changed, and successive transplants do not allow the isolation of colony that degrades the isooctane.

EXAMPLE 3 (Effect of the Isooctane Concentration)

The *Corynebacterium urealyticum* CIP-I-2126 colony is cultivated under the same conditions of temperature and stirring as in Example 1, in the presence of the following isooctane concentrations: 275, 690, 1100 and 2200 mg/L. The degradation rates of the isooctane in the different tests are indicated in Table 2.

TABLE 2

Influence of the Isooctane Concentration on the Degradation

| INITIAL CONTENT OF ISOOCTANE (MG/L) | DEGRADATION RATE (%) |
|---|---|
| 275 | 100 |
| 690 | 100 |
| 1100 | 95 |
| 2200 | 91 |

Table 2 indicates that the C. urealyticum CIP-I-2126 colony is capable of degrading the isooctane at more than 90% up to at least 2.2 g of isooctane per liter of medium and that it has excellent resistance to the toxic effect of the pollutants.

EXAMPLE 4 (Capacity for Degradation of the Individual Hydrocarbons)

The capacity for degradation of the pure individual hydrocarbons by the *C. urealyticum* CIP-I-2126 colony is studied under conditions that are identical to those that are used for isooctane in the example but by using said hydrocarbons as a growth substrate. The degradation and mineralization rates that are determined after 28 days are presented in Table 3.

TABLE 3

Degradation of Individual Compounds by the *C. urealyticum* CIP-I-2126 Colony

| FAMILIES | COMPOUNDS | DEGRADATION RATE (%) |
|---|---|---|
| Isoalkanes | 2-Methylpentane | 100 |
|  | 2-methylhexane | 100 |
|  | 3-methylhexane | 100 |
|  | 2-methylheptane | 100 |
|  | 3-methylheptane | 100 |
|  | 2-methyloctane | 100 |
|  | 2,3-dimethylpentane | 100 |
|  | 2,4-dimethylpentane | 100 |
|  | 2,4-dimethylhexane | 100 |
|  | 2,5-dimethylhexane | 100 |
|  | 2,2-dimethylpentane | 100 |
|  | 3,3-dimethylpentane | 34 |
|  | 2,2-dimethylhexane | 27 |
|  | 3,4-dimethylhexane | 100 |
|  | 2,3,4-trimethylpentane | 87 |
|  | 2,2,4-trimethylhexane | 28 |
| Linear Alkanes | Heptane | 100 |
|  | octane | 100 |
|  | decane | 100 |
| Cyclic Alkane | Cyclohexane | 0 |
| Aromatic Compounds | Benzene | 0 |
|  | toluene | 98 |
|  | m-xylene | 100 |
|  | p-xylene | 97 |
|  | o-xylene | 0 |
|  | ethylbenzene | 0 |
|  | n-propylbenzene | 0 |
|  | 1-methyl 2-ethyl benzene | 0 |
|  | 1-methyl 3-ethyl benzene | 0 |
|  | 1-methyl 4-ethyl benzene | 0 |
| Ethers | tert-Butyl ethyl ether | 81 |
|  | tert-butyl methyl ether | 32 |
|  | tert-amyl methyl ether | 51 |

Table 3 indicates that the *C. urealyticum* colony totally degrades 13 of the 16 isoalkanes that are tested while the other three isoalkanes (3,3-dimethylpentane, 2,2-dimethylhexane, 2,2,4-trimethylhexane) are partially degraded. The spectrum of products (hydrocarbons and other compounds) that are degraded by this colony is particularly broad.

EXAMPLE 5 (Degradation of n-Alkanes and Isoalkanes of High Molecular Weight)

Example 4 is repeated by replacing, in two separate tests, the individual compounds of the gasoline by n-hexadecane, on the one hand, and by 2,6,10,14-tetramethylpentadecane (pristane), on the other hand, which are compounds of the gas oil fraction. After 28 days of incubation at 30° C., the amount of carbon substrate in the two tests is measured by gas phase chromatography. The degradation rates are then respectively equal to 88 and 89%.

EXAMPLE 6 (Capacity for Degradation of Hydrocarbons in a Mixture)

The degradation of a mixture of hydrocarbons by the *C. urealyticum* CIP-I-2126 colony under temperature and stirring conditions that are identical to those that are used for isooctane in Example 1, but with the mixture as a growth substrate, is studied. The mixture consists of 23 majority hydrocarbons that are representative of a commercial gasoline. These 23 compounds, taken together, represent more than 90% of the complete gasoline. The content of each hydrocarbon in the mixture is the same for all of the hydrocarbons. The amount of mixture that is used is 400 mg/L of the MMSV medium. The degradation rates of each of the compounds, determined after 28 days, are presented in Table 4.

TABLE 4

Degradation of a Gasoline Model Mixture

| COMPOUNDS | DEGRADATION RATE (%) |
|---|---|
| Heptane | 100 |
| octane | 100 |
| 2-methylhexane | 93 |
| 3-methylhexane | 92 |
| 3-methylheptane | 95 |
| 2,5-dimethylhexane | 74 |
| 2,4-dimethylhexane | 83 |
| 2,2,4-trimethylpentane | 97 |
| 2,3,4-trimethylpentane | 100 |
| cyclohexane | 57 |
| benzene | 13 |
| toluene | 93 |
| ethylbenzene | 100 |
| m-xylene | 92 |
| p-xylene | 100 |
| o-xylene | 90 |
| n-propylbenzene | 100 |
| 1-methyl 2-ethylbenzene | 100 |
| 1-methyl 3-ethylbenzene | 100 |
| 1-methyl 4-ethylbenzene | 100 |
| 1,3,5-trimethylbenzene | 53 |
| 1,2,4-trimethylbenzene | 100 |
| 1,2,3-trimethylbenzene | 50 |
| MTBE | 62 |
| ETBE | 72 |
| TAME | 74 |
| TOTAL | 83 |

Table 4 indicates that all of the isoalkanes are degraded at least partially when they are provided with the colony in the form of a mixture. These compounds such as ethylbenzene, o-xylene and cyclohexane, which were not degraded when they were provided individually to the colony, are degraded when they are provided in the form of a mixture. This observation tends to indicate that C. urealyticum CIP-I-2126 is capable of degrading these compounds by co-metabolism, i.e., by using another hydrocarbon as a carbon source and as an energy source.

EXAMPLE 7 (Reinforcement of Microflora for the Degradation of Gasoline)

The degradation of a gasoline in which the compounds whose volatility is greater than or equal to that of the pentane have been eliminated by activated sludges (see Example 2) and by the activated sludges to which the C. urealyticum CIP-I-2126 colony is added is studied comparatively. The conditions of temperature and stirring are identical to those of Example 1. The growth substrate is a depentanized gasoline that is added to a final concentration of 400 mg/L. The degradation rates that are determined in the two tests are 28 days are presented in Table 5.

TABLE 5

Degradation of a Topped Gasoline

| HYDROCARBON CLASSES | DEGRADATION RATE (%) | |
|---|---|---|
| | ACTIVATED SLUDGES | ACTIVATED SLUDGES + CIP-I-2126 Colany |
| Monoaromatic compounds | 100 | 100 |
| isoalkanes | 75 | 100 |
| linear alkanes | 92 | 100 |
| cyclic alkanes | 100 | 100 |
| alkenes | 100 | 100 |
| ETBE | 7 | 100 |
| MTBE | 5 | 100 |

Table 5 shows that the reinforcement of activated sludges with the C. urealyticum CIP-I-2126 colony makes possible the degradation of alkanes and isoalkanes and leads to a total degradation of the gasoline in the test. The mineralization rate is close to 72%, whereby the remainder is incorporated in large part in the cellular biomass.

What is claimed is:

1. A process for treating hydrocarbon-containing effluents comprising isoalkanes so as to reduce at least in part the hydrocarbon concentration, said process comprising growing, in the presence of a substrate, a Corynebacterium urealyticum CIP-I-2126 bacterium so as to obtain a biomass of said bacterium, and and contacting said effluents with said biomass of said bacterium so as to degrade the hydrocarbons contained in said effluent.

2. A process according to claim 1, wherein said bacterium is previously selected from a phreatic layer formerly contaminated by a gasoline fraction before being inoculated in the presence of said hydrocarbon-containing effluent.

3. A process according to claim 1, wherein the substrate comprises said hydrocarbon-containing effluents.

4. A process according to claim 1, wherein the substrate is selected from the group consisting of alcohols having 2 to 8 carbon atoms, optionally hydroxylated aliphatic monoacids or polyacids with 2 to 8 carbon atoms, optionally hydroxylated aliphatic monoacid or polyacid salts with 2 to 8 carbon atoms, isooctane and mixtures thereof.

5. A process according to claim 1, wherein the substrate is selected from the group consisting of ethanol, isooctane, acetate of an alkaline metal salt or ammonium salt, and mixtures thereof.

6. A process according to claim 1, wherein the hydrocarbon concentration in the liquid effluents is at most equal to 1700mg/L.

7. A process according to claim 1, wherein the effluents contain a gasoline fraction.

8. A process according to claim 1, wherein the effluents contain a kerosene fraction.

9. A process according to claim 1, wherein the effluents contain a gas oil fraction.

10. A process according to claim 1, wherein the effluents also contain at least one ether.

11. A process according to claim 10, wherein the ether is MTBE, ETBE, TAME or a mixture thereof.

12. A process according to claim 10, wherein the effluents that contain ether are degraded by the biomass of said bacteria in the presence of at least one colony that is selected from the group that is formed by Pseudomonas cepacia CIP I-2052, Arthrobacter globilis ATCC 53596, Bacillus vaccae JOB5 for mineralizing essentially the entire ether.

13. A process according to claim 10, wherein the concentration of ether in the liquid effluents is between 50 and 1500 mg/L.

14. A process according to claim 1, wherein said bacteria are developed in a system of at least one biofilter the effluents are introduced in the presence of air or oxygen into the biofilter at a feed rate of 0.1 to 2 L/L of biofilter/hour, and the effluent from which hydrocarbons and optionally ethers are removed at least in part is drawn off.

15. A process according to claim 14, wherein the biofilter also contains an activated sludge.

16. A process according to claim 14, wherein the effluents are moved into a first stage in a biofilter system that contains an activated sludge, and in a second stage, effluents that result from the first stage are introduced in the presence of air or oxygen into a biofilter system that contains at least said *Corynebacterium urealyticum* CIP-I-2126 bacteria, and effluents from which pollution is removed are recovered.

17. A process according to claim 6, wherein the hydrocarbon concentration is between 300 and 1000 mg/L.

18. A process for reducing hydrocarbon concentration in an effluent, comprising treating said effluent with *Corynebacterium urealyticum* CIP-1-2126.

19. A process according to claim 18, wherein the effluent is groundwater.

20. A process according to claim 18, wherein the effluent is a gas.

21. A process according to claim 20, wherein the gas is produced by aerating soil.

* * * * *

UNITED STATES PATENT AND TRADEMARK OFFICE
CERTIFICATE OF CORRECTION

PATENT NO.     : 6,403,365 B1
DATED          : June 11, 2002
INVENTOR(S)    : Solano-Serena et al.

It is certified that error appears in the above-identified patent and that said Letters Patent is hereby corrected as shown below:

<u>Column 8,</u>
Line 27, delete "and" (second occurrence).

Signed and Sealed this

Eleventh Day of February, 2003

JAMES E. ROGAN
*Director of the United States Patent and Trademark Office*